United States Patent
Wang et al.

(10) Patent No.: US 10,541,523 B2
(45) Date of Patent: Jan. 21, 2020

(54) SPACER FOR WIND TURBINE CABLES

(71) Applicants: GENERAL ELECTRIC COMPANY, Schenectady, NY (US); Jiahong Wang, Shanghai (CN); Craig Dement, Ellington, MO (US); Jiemin Fu, Shanghai (CN); Jay Leonard, Greenville, SC (US); Yang Liu, Shanghai (CN); Roman Kolar, Hendersonville, NC (US); Edward Wayne Hardwicke, Greenville, SC (US); Andre Langel, Stadtlohn (DE)

(72) Inventors: Jiahong Wang, Shanghai (CN); Craig Dement, Ellington, MO (US); Jiemin Fu, Shanghai (CN); Jay Leonard, Greenville, SC (US); Yang Liu, Shanghai (CN); Roman Kolar, Hendersonville, NC (US); Edward Wayne Hardwicke, Greenville, SC (US); Andre Langel, Stadtlohn (DE)

(73) Assignee: General Electric Company, Schenectady, NY (US)

( * ) Notice: Subject to any disclaimer, the term of this patent is extended or adjusted under 35 U.S.C. 154(b) by 239 days.

(21) Appl. No.: 15/514,690

(22) PCT Filed: Oct. 3, 2014

(86) PCT No.: PCT/CN2014/088097
§ 371 (c)(1),
(2) Date: Mar. 27, 2017

(87) PCT Pub. No.: WO2016/049941
PCT Pub. Date: Apr. 7, 2016

(65) Prior Publication Data
US 2017/0237248 A1 Aug. 17, 2017

(51) Int. Cl.
*H02G 3/34* (2006.01)
*H02K 7/18* (2006.01)

(52) U.S. Cl.
CPC ............ *H02G 3/34* (2013.01); *H02K 7/1838* (2013.01)

(58) Field of Classification Search
None
See application file for complete search history.

(56) References Cited

U.S. PATENT DOCUMENTS

| 4,710,100 | A | * | 12/1987 | Laing | .................... F03D 9/28 416/11 |
| 6,713,891 | B2 | * | 3/2004 | Kirkegaard | .............. H02G 7/00 290/44 |

(Continued)

FOREIGN PATENT DOCUMENTS

| CN | 202004388 | * | 10/2011 | |
| CN | 102272445 | A | 12/2011 | |
| GB | 2466919 | * | 7/2010 | ............. F16G 11/10 |

OTHER PUBLICATIONS

International Search Report dated Jun. 19, 2015, issued in connection with International Application No. PCT/CN2014/088097.

*Primary Examiner* — Michael Lebentritt
(74) *Attorney, Agent, or Firm* — Dority & Manning, P.A.

(57) ABSTRACT

The present disclosure is directed to a cable securement assembly for protecting cables and/or cable bundles within a wind turbine. The cable securement assembly includes a cable spacer having an inner surface and an outer surface separated by a thickness and one or more fastening components. The inner surface defines an open center configured to receive the plurality of cables therein. The inner surface defines a plurality of cable locations defined by one or more through holes configured through the thickness. The one or more fastening components are configured to secure one or (Continued)

more of the plurality of cables at each cable location via the through holes.

18 Claims, 9 Drawing Sheets

(56) References Cited

U.S. PATENT DOCUMENTS

| | | | | |
|---|---|---|---|---|
| 8,366,396 | B2 | 2/2013 | Barton | |
| 8,866,330 | B2* | 10/2014 | Domesle | F03D 80/00 290/55 |
| 9,551,326 | B2* | 1/2017 | Caspari | H02G 3/32 |
| 2010/0247326 | A1* | 9/2010 | Prebio | F03D 80/00 416/244 R |
| 2011/0067353 | A1* | 3/2011 | Tadayon | F03D 13/10 52/745.18 |
| 2011/0162865 | A1* | 7/2011 | Ueno | H02G 11/00 174/79 |
| 2011/0283640 | A1* | 11/2011 | Miller | E02D 27/42 52/292 |
| 2013/0081252 | A1* | 4/2013 | Markgraf | F16B 19/14 29/432 |
| 2014/0217741 | A1* | 8/2014 | Christensen | F03D 80/85 290/55 |
| 2014/0286778 | A1* | 9/2014 | Moestrup | F03D 1/06 416/205 |
| 2015/0361679 | A1* | 12/2015 | Kent | E04G 3/20 52/40 |
| 2016/0237985 | A1* | 8/2016 | Bogl | B66C 23/185 |
| 2018/0320668 | A1* | 11/2018 | Maryniok | H02G 3/30 |

\* cited by examiner

SPACER FOR WIND TURBINE CABLES

FIELD OF THE INVENTION

The present subject matter relates generally to wind turbines and, more particularly, to a spacer for wind turbine drip-loop cables.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

In many wind turbines, the nacelle contains many electrical components that enable a controlled and efficient conversion of wind energy into electrical energy such as, for example, one or more generators, a wind turbine controller, and/or cooling systems. In addition, cables that feed electrical power into electrical supply grids are often routed from the nacelle to the electrical supply grids via the tower. Thus, a plurality of cables may be present in and around the nacelle, as well as down through the tower (e.g. through openings in one or more tower platforms) so as to couple all of the electrical components to a power source.

To maximize the energy production of a wind turbine, the nacelle is typically able to rotate or pivot versus the fixed position of the tower. This allows the rotor blades to be in an optimum position with respect to the wind direction. Hence, the wind turbine is able to exploit a maximum amount of wind energy at all times. Equally, to avoid unfavorable wind gusts or extremely high wind speeds the position of the nacelle may be adjusted accordingly. Based on this movement of the nacelle the cables routed from the nacelle to the tower may be pulled together in a kind of knurl, which is not under control. This twisting and curling behavior of the cables during operation of a wind turbine may lead to several issues such as overheating in the knurls or undesired movement of cables. The undesired movement of the cables may cause excessive wear to the cables and/or may damage surrounding structures. In the worst case, such uncontrolled movements of the cables may result in entanglement of the cables inside of the tower that may eventually lead to system failure.

To address the aforementioned issues, fiberglass reinforced material may be installed around the cable bundles and/or rubber mats may be installed within tower platform openings to control undesired movements of the cables. In certain wind turbines, however, the fiberglass reinforced material fails to stay installed around the cables. Still additional methods for protecting drip loop cables include utilizing large PVC tubing installed within tower platform openings. However, in many cases, such tubing results in high cable air temperatures.

In view of the foregoing, an improved system and method for spacing apart and protecting drip loop cables within the wind turbine would be welcomed in the art. Hence, the subject matter of the present disclosure is directed to a cable securement assembly having an cable spacer.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a cable securement assembly configured to space apart and protect a plurality of cables within a wind turbine is disclosed. The cable securement assembly includes a cable spacer having an inner surface and an outer surface separated by a thickness and one or more fastening components. Further, the inner surface defines an open center configured to receive the plurality of cables therein. The inner surface defines a plurality of cable locations defined by one or more through holes configured through the thickness. The one or more fastening components are configured to secure one or more of the plurality of cables at each cable location via the through holes.

In one embodiment, the fastening components may include at least one of zip ties, ropes, strings, plastic inserts, fasteners, or similar. In another embodiment, the cable spacer may be configured or sized to fit within at least one of an opening of a platform within a tower of the wind turbine or a drip loop bracket.

In further embodiments, the cable spacer may be formed from one continuous piece of material. In addition, the continuous piece of material may include a slot configured to assist with installation of the one or more cables therein. In alternative embodiments, the cable spacer may be formed from multiple segments joined together. Further, the multiple segments may be joined together via one or more fastening components as described herein. In yet another embodiment, each of the multiple segments may include corresponding locking ends such that the multiple segments may be joined together via the corresponding locking ends.

In another aspect, the present disclosure is directed to a wind turbine. The wind turbine includes a tower secured to a support surface and having at least one platform configured therein, a nacelle configured atop the tower, a plurality of cables configured within the tower and the nacelle, and a cable securement assembly configured to space apart and protect the cables within the tower. The cable securement assembly includes a cable spacer having an inner surface and an outer surface separated by a thickness and one or more fastening components. Further, the inner surface defines an open center configured to receive the plurality of cables therein. The inner surface defines a plurality of cable locations defined by one or more through holes configured through the thickness. The one or more fastening components are configured to secure one or more of the plurality of cables at each cable location via the through holes. It should be understood that the cable securement assembly may also include any of the additional features as described herein.

In yet another aspect, the present disclosure is direction to a method for securing and protecting a plurality of cables within a wind turbine. For example, in one embodiment, the method includes securing one or more of the plurality of cables within a first segment of a cable spacer at one or more cable locations via one or more fastening components. Another step includes securing one or more of the plurality of cables within a second segment of the cable spacer at one or more cable locations via one or more fastening components. The method also includes securing the first and second segments together, wherein the cable spacer is configured to space apart and protect the plurality of cables therein.

In another embodiment, the plurality of cable locations may be defined by one or more through holes configured through a thickness of the cable spacer. Thus, the method may also include inserting one or more fastening components into the one or more through holes so as to secure one or more of the plurality of cables at each cable location. In still a further embodiment, the method may include securing the first and second segments together via one or more fastening components or corresponding locking ends of the first and second segments.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "cable" is intended to be representative of any type of cable such as, for example, single-double- or triple-core power cables, radial field or collectively shielded power cables or any other conductive or non-conductive cables or cords that are routed from the nacelle to the tower of a wind turbine, for example, control cables.

Generally, the present disclosure is directed to a wind turbine system that controls movements of internal cables configured therein and protects said cables from mechanical abrasion. More specifically, the wind turbine system may include a cable securement assembly having at least one cable spacer that provides spacing of the cables to manage thermal performance and mechanical protection thereof. Further, the cable spacer has inner and outer surfaces separated by a thickness. The inner surface defines an open center configured to receive the plurality of cables therein. For example, in one embodiment, the cable spacer permits insertion of the cables therein by having a segmented configuration. More specifically, the cable spacer may include first and second halves that are detachable such that the cables can be inserted therein and the halves can be reattached. Alternatively, the cable spacer may be a single, continuous piece of material having a slot configured through a side wall thereof such that the cables can be inserted into the spacer via the slot. Thus, the cable spacer is configured to permit insertion of the cables therein through the side wall of the cable spacer. Further, the cable spacer can be installed and/or removed from existing wind turbine systems.

In addition, the cable spacer may include a plurality of cable locations defined by one or more through holes configured through the thickness of the spacer. Thus, fastening components may be configured to secure cables and/or cable bundles at each cable location via the through holes. Accordingly, the various embodiments of the cable spacer described herein prevents several issues associated with wind turbine cables, including, but not limited to overheating, movement (or entanglement) of the cables, and/or unnecessary wear on the cables and surrounding structures.

In addition, the spacers may further increase the reliability and service life of wind turbines by minimizing the risk of system failure due to entanglement of the cables. Such system failures may require interrupting the operation of a wind turbine for de-entanglement or repairs associated with uncontrolled cables. Further, the spacers are configured to increase safety with respect to service personnel that may need to access the nacelle or tower during operation of a wind turbine.

Figure 1:
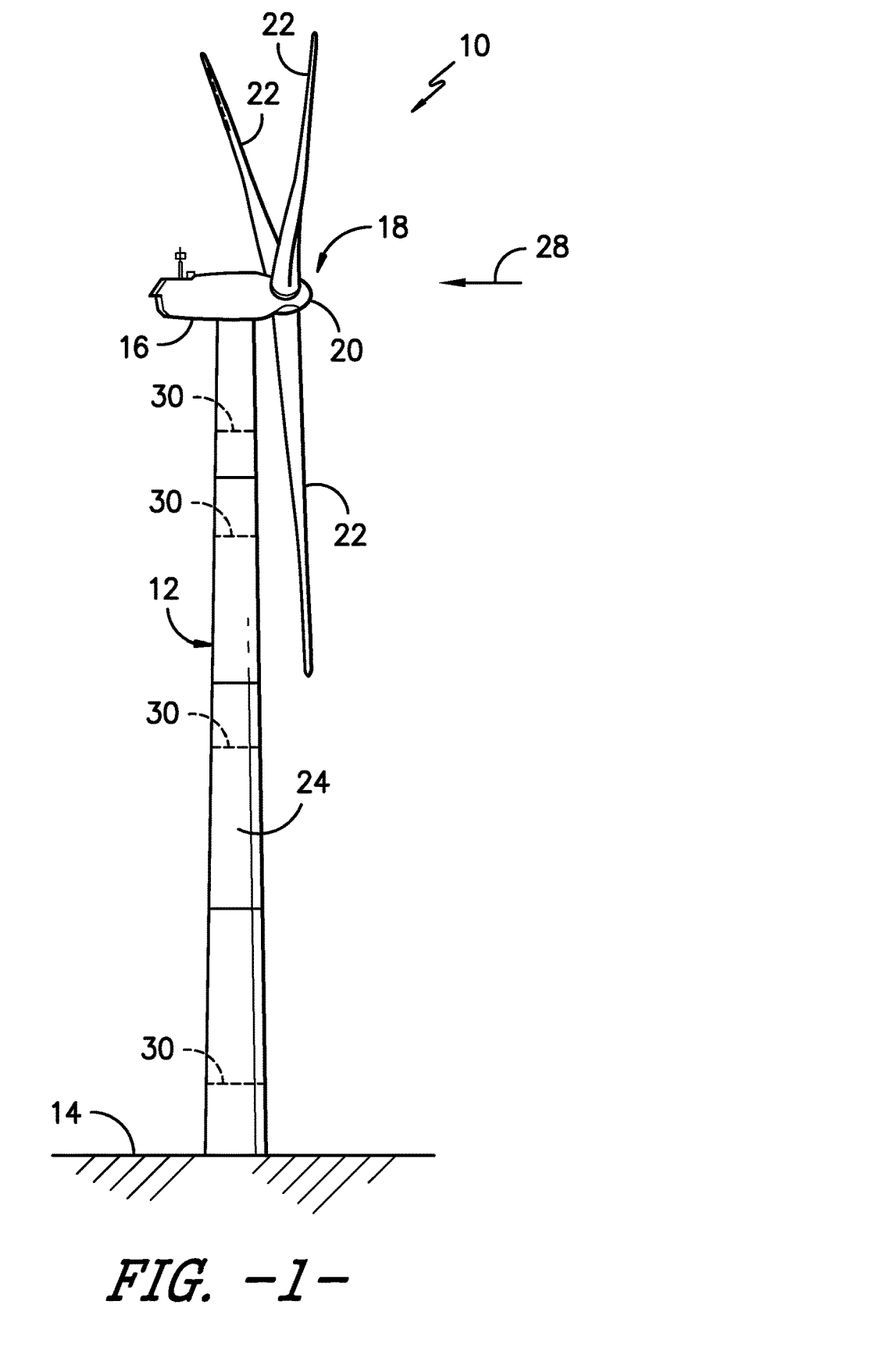
FIG. 1 illustrates a perspective view of one embodiment of a wind turbine according to the present disclosure.

Referring to the drawings, FIG. 1 illustrates a perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to the nacelle 16, which encloses an electric generator (not shown) to permit electrical energy to be produced.

The tower 12 may also include a plurality of tower sections 24 assembled atop one another. Further, the tower 12 may be constructed of any number of tower sections 24. For example, in the illustrated embodiment, the tower 12 includes four tower sections 24. In addition, the tower sections 24 may include one or more platforms 30 that are integrated with a tower section 24 and/or mounted with a tower section 24.

The platforms 30 provide operators safe access to areas of the wind turbine 10 that may require servicing, maintenance, and inspection. For example, the platforms 30 may be located adjacent to tower flange bolts for safe and easy inspection, or may be located adjacent to preassembled power modules for inspection and maintenance purposes. Thus, the location of the platforms 30 within a tower section 24 may vary so as to accommodate the needs of a specific wind turbine 10.

Figure 2:
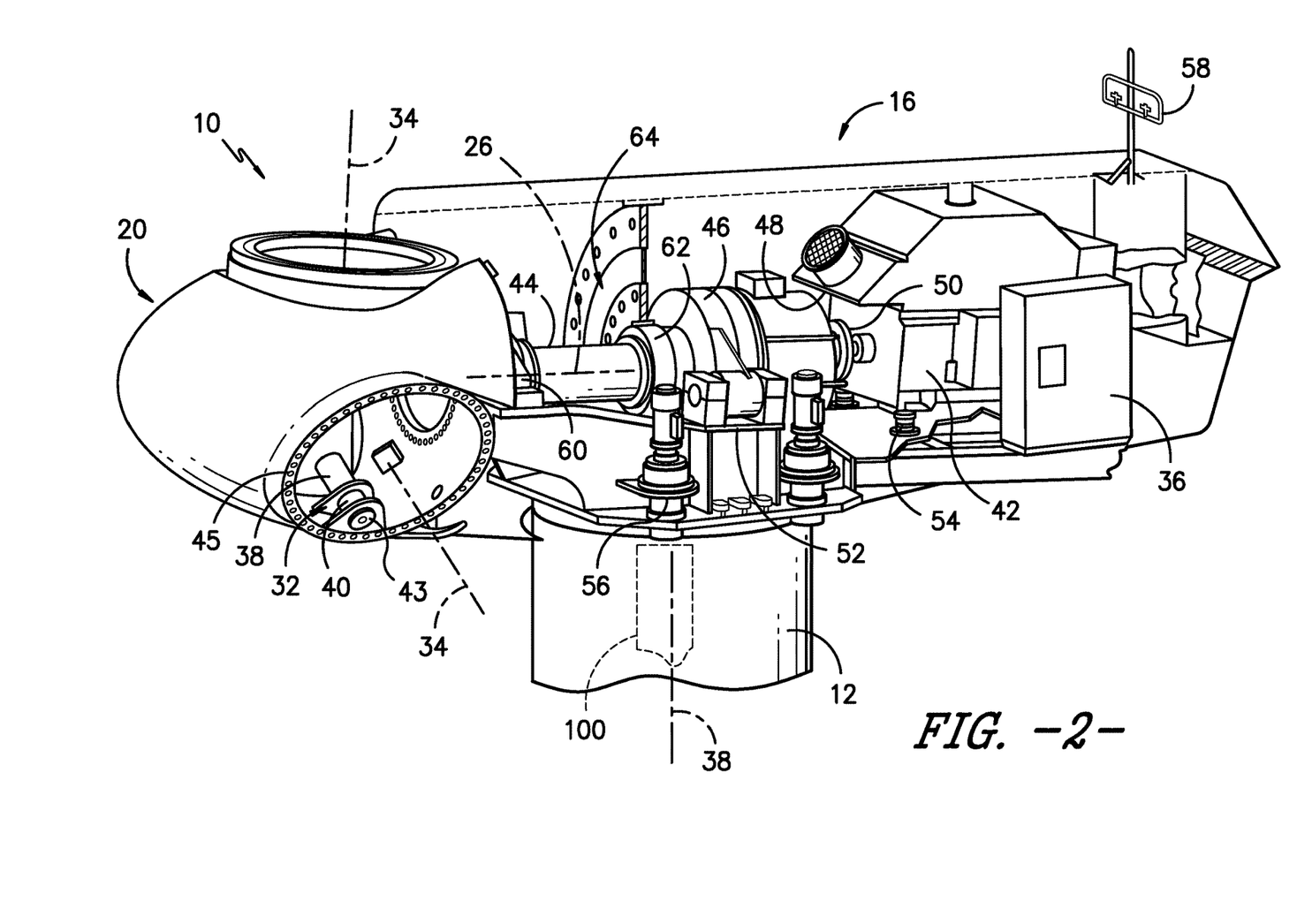
FIG. 2 illustrates an internal, perspective view of one embodiment of a nacelle of a wind turbine according to the present disclosure.

Referring now to FIG. 2, an enlarged perspective view of the nacelle 16 of the wind turbine 10 including the cable securement assembly 100 according to the present disclosure is illustrated. As shown, the hub 20 is rotatably coupled to an electric generator 42 positioned within nacelle 16 by rotor shaft 44 (sometimes referred to as either a main shaft or a low speed shaft), a gearbox 46, a high speed shaft 48, and a coupling 50. Further, the rotor shaft 44 is disposed coaxial to longitudinal axis 26. Rotation of the rotor shaft 44 rotatably drives the gearbox 46 that subsequently drives the high speed shaft 48. Thus, the high speed shaft 48 rotatably drives the generator 42 with the coupling 50 and rotation of the high speed shaft 48 facilitates production of electrical power by the generator 42. In addition, as shown in the illustrated embodiment, the gearbox 46 and the generator 42 may be supported by support 52 and support 54. In the exemplary embodiment, the gearbox 46 utilizes a dual-path geometry to drive the high speed shaft 48. Alternatively, the rotor shaft 44 may be coupled directly to the generator 42 with the coupling 50.

Each rotor blade 22 may also include a pitch adjustment mechanism 32 configured to rotate each rotor blade 22 about its pitch axis 34. For example, as shown, the pitch adjustment mechanism 32 may include a pitch drive motor 38 (e.g., any suitable electric motor), a pitch drive gearbox 40, and a pitch drive pinion 43. In such embodiments, the pitch drive motor 38 may be coupled to the pitch drive gearbox 40 such that the pitch drive motor 38 imparts mechanical force to the pitch drive gearbox 40. Similarly, the pitch drive gearbox 40 may be coupled to the pitch drive pinion 43 for rotation therewith. The pitch drive pinion 43 may, in turn, be in rotational engagement with a pitch bearing 45 coupled between the hub 20 and a corresponding rotor blade 22 such that rotation of the pitch drive pinion 43 causes rotation of the pitch bearing 45. Thus, in such embodiments, rotation of the pitch drive motor 38 drives the pitch drive gearbox 40 and the pitch drive pinion 43, thereby rotating the pitch bearing 45 and the rotor blade 22 about the pitch axis 34.

The nacelle 16 may also include a yaw drive mechanism 56 that may be used to rotate the nacelle 16 and the hub 20 about the yaw axis 38 to control the perspective of the rotor blades 22 with respect to the wind direction 28 (FIG. 1). In addition, the nacelle 16 may also include at least one meteorological mast 58 that includes a wind vane and anemometer (neither shown in FIG. 2). The mast 58 provides information to control system 36 that may include wind direction and/or wind speed. The control system 36 is configured to control the wind turbine 10 and/or any wind turbine components thereof.

Still referring to FIG. 2, the nacelle 16 may also include a main forward support bearing 60 and a main aft support bearing 62. The forward support bearing 60 and the aft support bearing 62 facilitate radial support and alignment of the rotor shaft 44. Further, the forward support bearing 60 is coupled to the rotor shaft 44 near the hub 20, whereas the aft support bearing 62 is positioned on the rotor shaft 44 near the gearbox 46 and/or the generator 42. Alternatively, the nacelle 16 may include any number of support bearings that enable the wind turbine 10 to function as disclosed herein. In addition, the rotor shaft 44, the generator 42, the gearbox 46, the high speed shaft 48, the coupling 50, and any associated fastening, support, and/or securing device including, but not limited to, support 52 and/or support 54, and forward support bearing 60 and aft support bearing 62, are sometimes referred to as a drive train 64.

Figure 3:
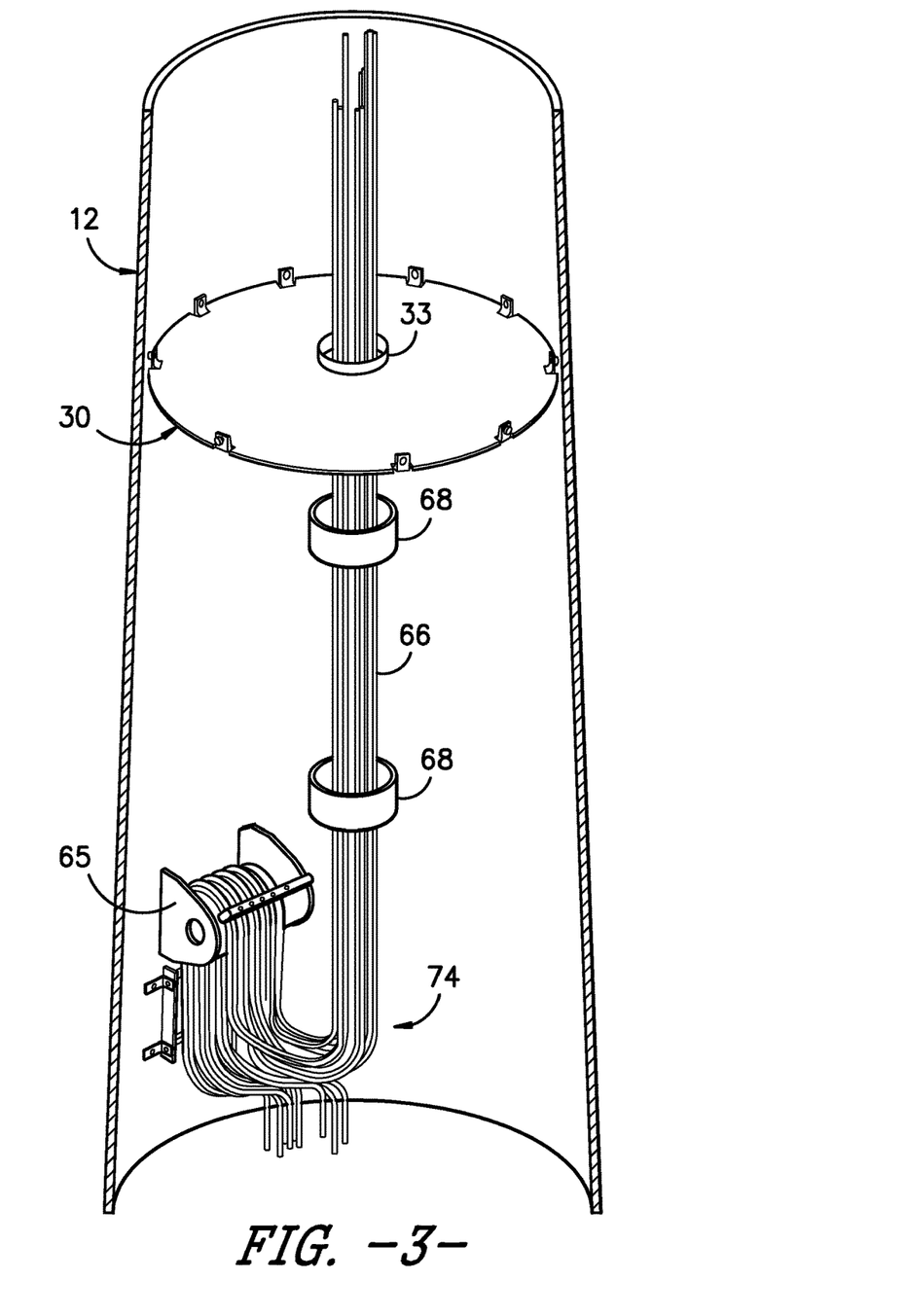
FIG. 3 illustrates an internal, perspective view of one embodiment of a tower of a wind turbine, particularly illustrating a plurality of cables within the tower according to the present disclosure.
Figure 4:
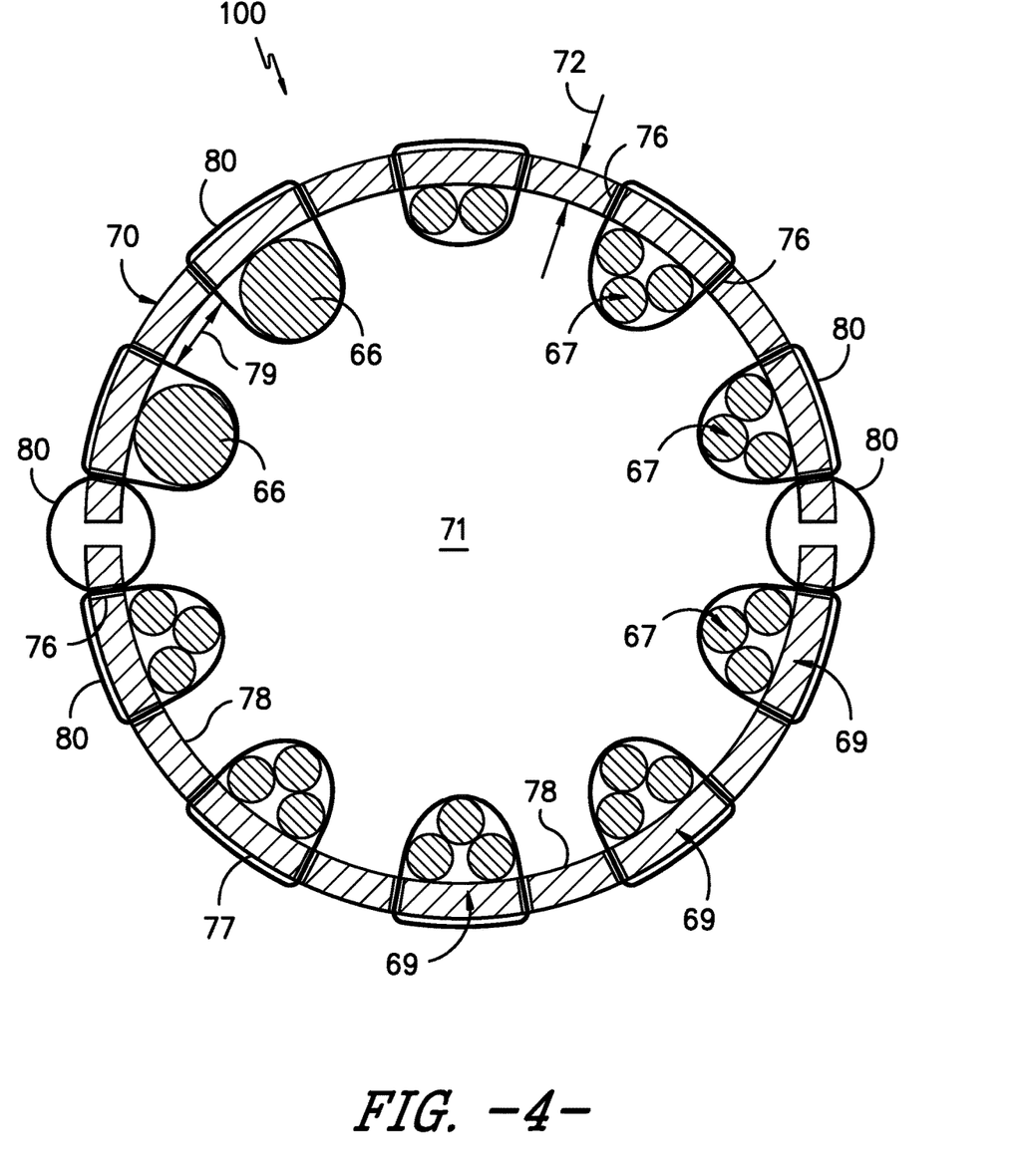
FIG. 4 illustrates a top view of one embodiment of a cable securement assembly, particularly illustrating an cable spacer having a plurality of cables configured therein, according to the present disclosure.

Referring now to FIGS. 3 and 4, a top view of a cable securement assembly 100 and example locations for the assembly 100 within the tower 12 are illustrated according to one embodiment of the present disclosure. As shown in FIG. 3, the tower 12 includes a plurality of cables 66 configured therein. More specifically, as shown, the plurality of cables 66 are routed from the nacelle 16 (FIG. 2) down through the tower 12 near the support surface 14 in a drip loop configuration. Thus, any platform(s) 30 within the tower 12 contain at least one platform opening 33 configured to allow the cables 66 to pass therethrough. In addition, the tower 12 may include one or more drip loop brackets 68 configured to maintain the drip loop 74 from swinging too far from side to side. The drip loop brackets 68 may also be used as supports for various tower components, such as, e.g. a twist switch (not shown). Further, the cables 66 may be routed through a drip loop saddle 65 or saddle deck that is typically located towards a lower portion of the tower 12 and is configured to hold the lower ends of the cables 66.

The cable securement assembly 100 includes one or more cable spacer(s) 70 located at any location along the vertical run of the drip loop cables 66, e.g. as shown in FIG. 3. For example, in one embodiment, the cable spacer 70 may be located within the platform opening 33 and/or within one or more of the drip loop brackets 68. Such locations have minimal clearances; therefore, the cable spacer 70 is designed so as to fit within such clearances. In further embodiments, the cable spacer(s) 70 may be located at any other location along the drip loop cables 66, in addition to those specific locations described herein.

Figure 5:
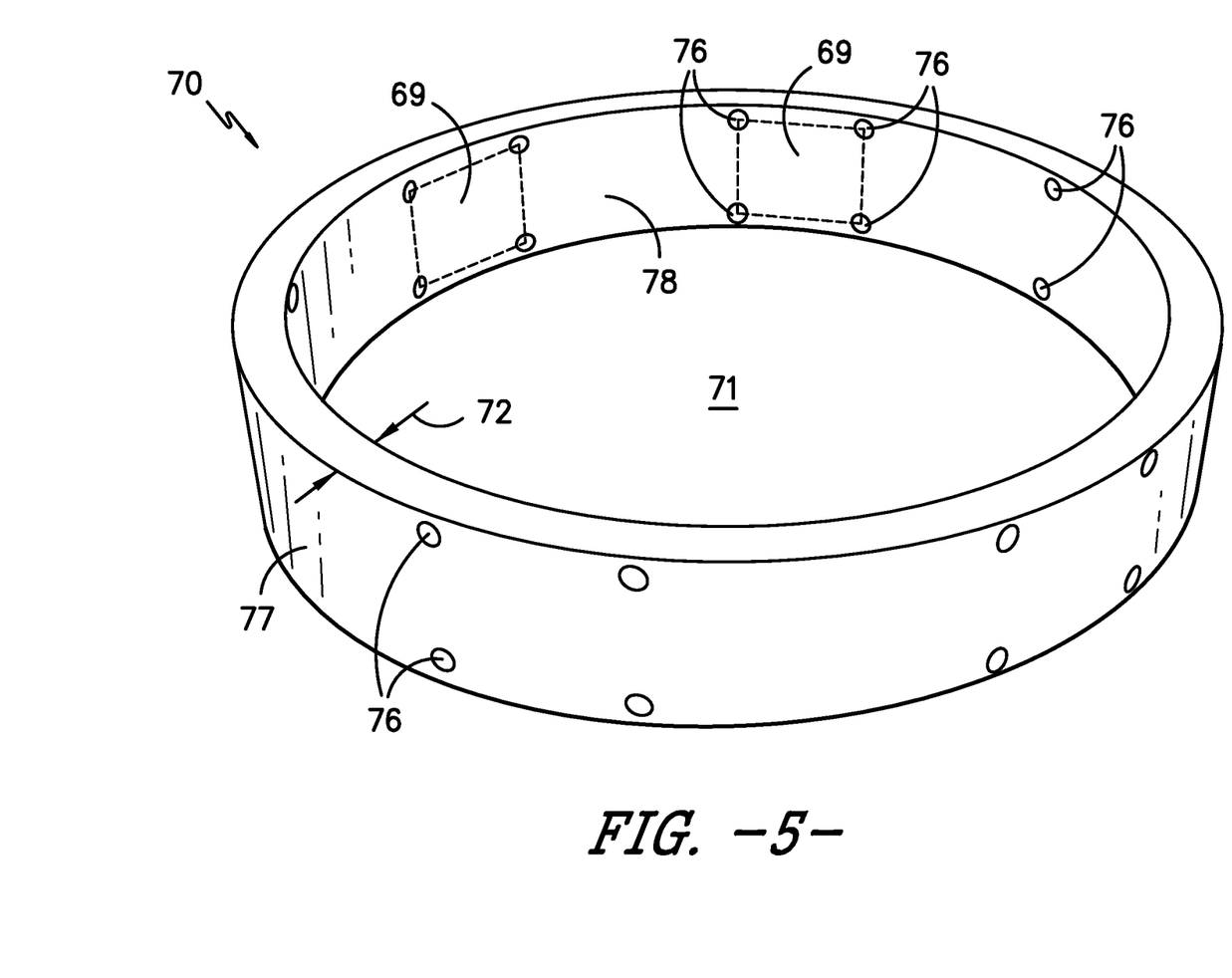
FIG. 5 illustrates a perspective view of one embodiment of an cable spacer according to the present disclosure.

Referring particularly to FIGS. 4 and 5, various components of the cable securement assembly 100 are illustrated. As shown, the assembly 100 includes at least one cable spacer 70 and one or more fastening components 80 that provide secure spacing of the cables 66 so as to manage thermal performance and mechanical protection thereof. Further, the cable spacer 70 has an inner surface 78 and an outer surface 77 separated by a thickness 72. The inner surface 78 defines an open center 71 configured to receive the plurality of cables 66 therein and a plurality of cable locations 69 defined by one or more through holes 76 configured through the thickness 72. Thus, the fastening components 80 are configured to secure the cables 66 and/or cable bundles 67 at each cable location 69 via the through holes 76.

It should be understood that any number of cable locations spaced apart by any suitable distance 79 may be defined within the cable spacer 70. Thus, the distance 79 between the cable locations may be adjustable to ensure proper ventilation of the cables 66 and/or to meet certain standard requirements (e.g. IEC, NEC, and CEC). For example, as shown in FIG. 4, ten cable locations 69 are spaced circumferentially by distance 79 about the spacer 70. In additional embodiments, the spacer 70 may include more than ten or less than ten cable locations 69 and the distance may be adjusted accordingly.

In particular embodiments, each of the cable locations 69 may be defined by one or more through holes 76. For example, as shown in FIG. 5, four through holes 76 define one of the cable locations 69. In still additional embodiments, any number of through holes 76, including more than four or less than four, may define a cable location 69. Thus, at least one cable 66 or cable bundle 67 may be positioned at each spacer location 69 and secured thereto by the fastening components 80 via through holes 76.

In addition, any number of cables 66 may be secured at each cable location 69. For example, as shown in FIG. 4, two cable locations 69 have a single cable 66 configured thereon; one cable location 69 contains a cable bundle 67 with two cables 66 configured thereon, and seven cable locations 69 contain cable bundles 67 having three cables 66 each. Alternatively, each cable bundle 67 may include more than three or less than three cables 66.

As mentioned, the through holes 76 of the spacer 70 are spaced circumferentially about the spacer 70 and extend from an outer surface 77 to an inner surface 78 thereof. Thus, the through holes 76 are configured to receive the one or more fastening devices 80 so as to secure the cables 66 and/or cable bundles 67 to the inner surface 78 of the spacer 70. For example, in one embodiment, the fastening components 80 may include zip ties, ropes, strings, plastic inserts, fasteners, or similar. It should be understood that the number of through holes 76, as well as the position and size of the through holes 76 may vary.

Figure 6:
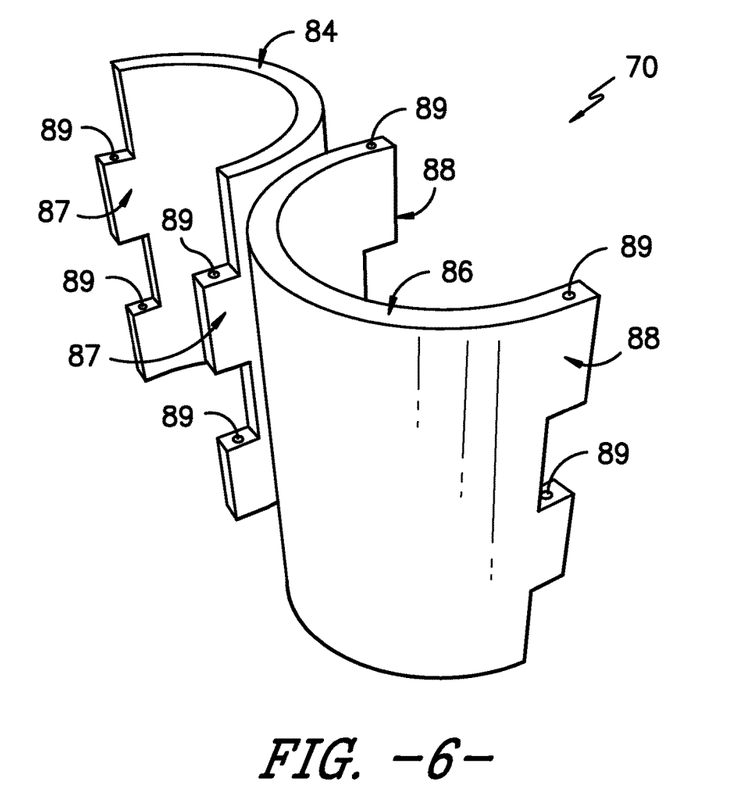
FIG. 6 illustrates a perspective view of another embodiment of an cable spacer according to the present disclosure.
Figure 7:
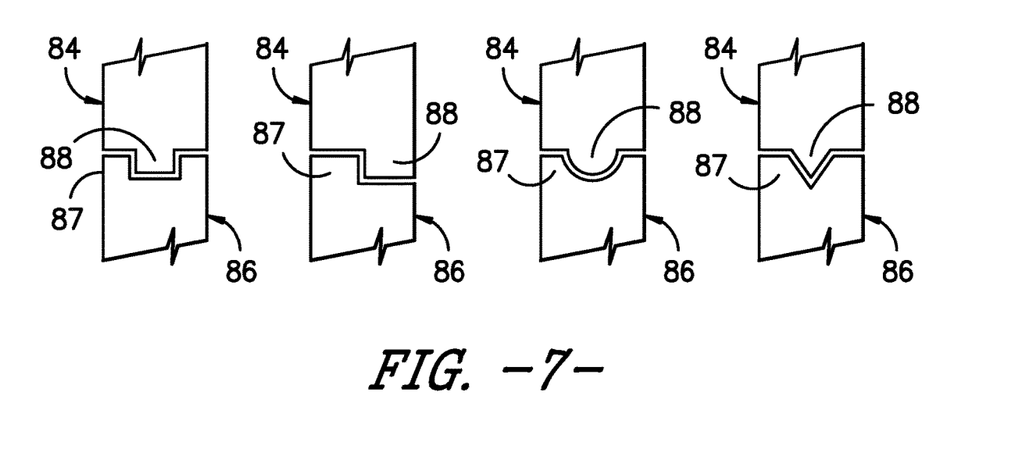
FIG. 7 illustrates multiple cross-sectional views of corresponding locking ends of various embodiments of an cable spacer according to the present disclosure.
Figure 8:
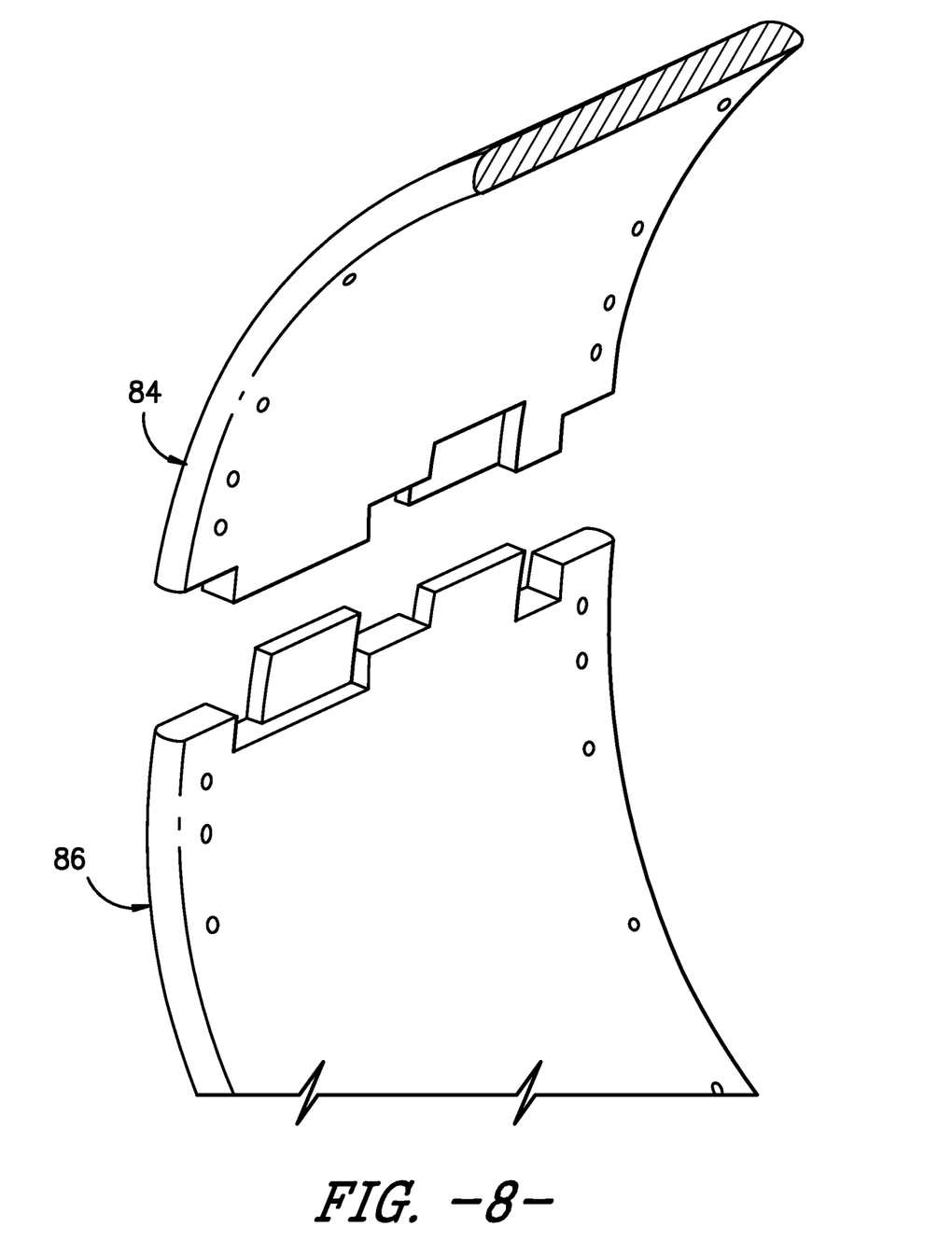
FIG. 8 illustrates a perspective view of another embodiment of corresponding locking ends of another embodiment of an cable spacer according to the present disclosure.

Referring now to FIGS. 6-8, various views of further embodiments of the cable spacer 70, particularly illustrating spacers formed from multiple segments, are illustrated. As shown in FIG. 6, for example, the cable spacer 70 may be formed from at least a first segment 84 and a second segment 86. In still additional embodiments, the cable spacer 70 may be formed from more than two segments. The multi-segmented configuration provides for simple installation of the cables 66 within the spacer 70 and subsequent joining thereof. In addition, each of the segments 84, 86 may include be joined together using any suitable joining means. For example, in one embodiment, the segments 84, 86 may be joined together via one of the fastening components 80 described herein. In still additional embodiments, each of the segments 84, 86 may include corresponding locking ends 87, 88 such that the multiple segments 84, 86 may be joined together via the corresponding locking ends 87, 88. The locking ends 87, 87 may have any suitable configuration so as to maintain contact between the two segments 84, 86. For example, as shown in FIG. 6, the corresponding locking ends 87, 88 may include alternating rectangular protrusions configured to mesh together. In addition, the corresponding locking ends 87, 88 may also include one or more through holes 89 to further assist with joining the segments 84, 86 together.

In still further embodiments, as shown in FIG. 7, additional corresponding locking ends 87, 88 suitable for joining the multiple segments 84, 86 are illustrated. As shown, the corresponding locking ends 87, 88 may have any suitable shape and/or configuration (e.g. rectangle, square, triangle, dovetail, zig-zag, circular, or similar) so as to maintain contact between the segments 82, 84. In addition, any combination of shapes and/or configuration may be used for the corresponding locking ends 87, 88. For example, as shown in FIG. 8, a combination of rectangular protrusions having varying heights form the corresponding locking ends 87, 88.

Figure 9:
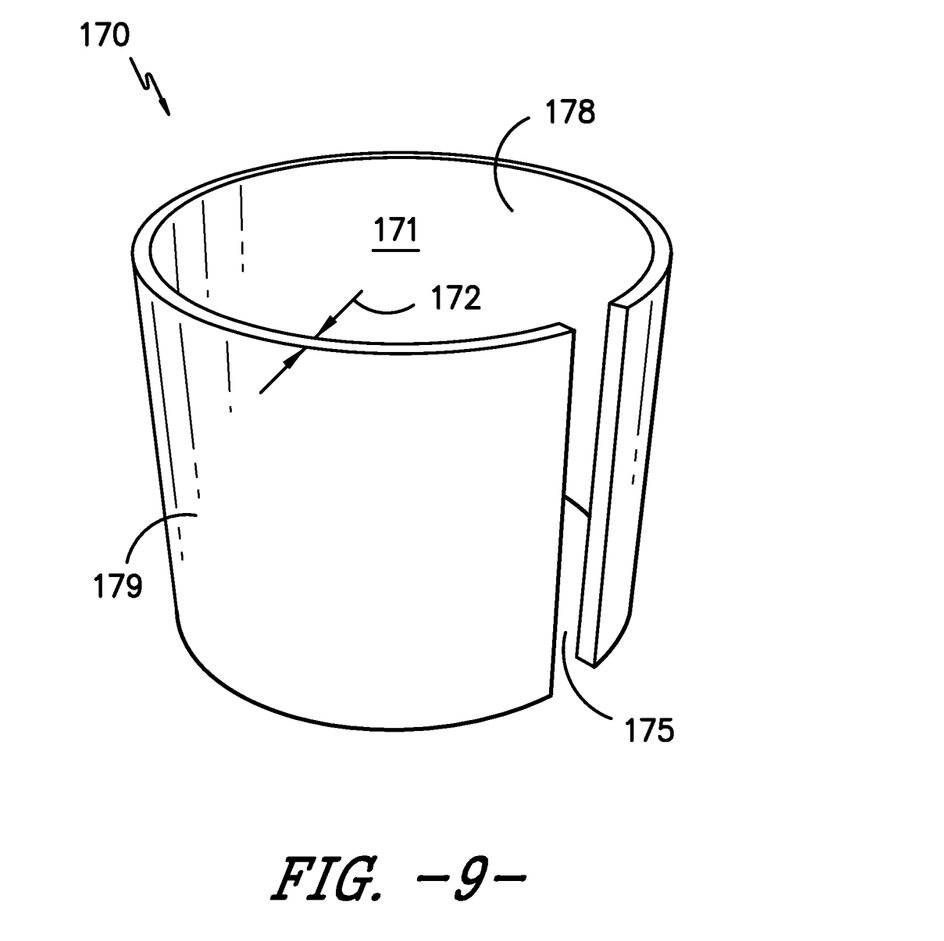
FIG. 9 illustrates a perspective view of another embodiment of an cable spacer according to the present disclosure.

In alternative embodiments, the cable spacer may be formed from one continuous piece of material. For example, FIG. 9 illustrates a cable spacer 170 having such a single-segment configuration. As shown, the spacer 170 has an inner surface 178 and an outer surface 177 separated by a thickness 172. The inner surface 178 defines an open center 171 configured to receive the plurality of cables 66 therein. In addition, the cable spacer 170 may include any of the additional features as described herein, e.g. a plurality of cable locations defined by one or more through holes, one or more fastening components configured through the through holes so as to secure the cables, etc. In addition, the cable spacer 170 may include a slot 175 configured axially through the spacer 70. Thus, in various embodiments, the slot 175 is configured to assist with installation of the cables within the cable spacer 70. The single-segment configuration provides a simple, easy to manufacture embodiment having all of the advantages as described herein pertaining to the multi-segmented configuration.

Figure 10:
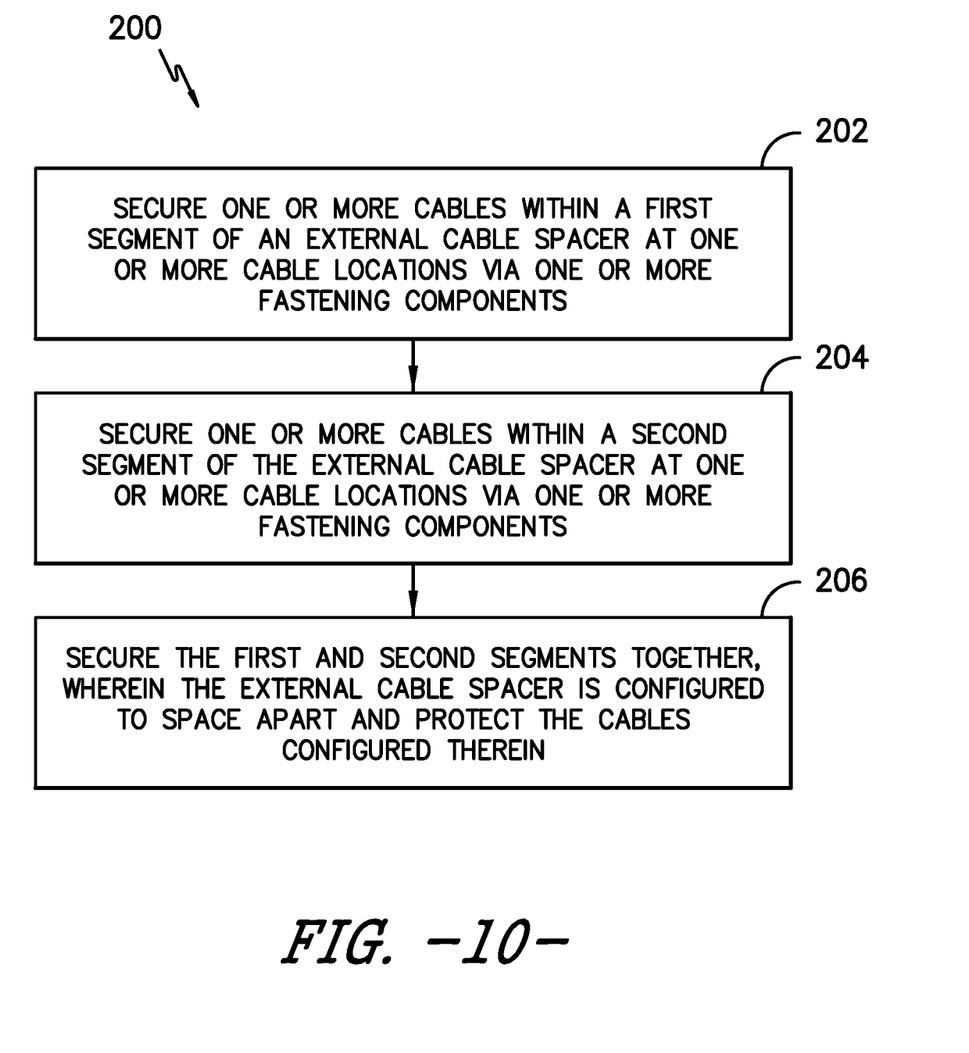
FIG. 10 illustrates a flow diagram of one embodiment of a method for securing and protecting a plurality of cables within a wind turbine according to the present disclosure.

Referring now to FIG. 10, a flow diagram of a method 200 for securing and protecting a plurality of cables within a wind turbine is illustrated. For example, as shown, the method 200 includes securing one or more of the cables within a first segment of a cable spacer at one or more cable locations via one or more fastening components (step 202). Another step 204 of the method 200 includes securing one or more of the cables within a second segment of the cable spacer at one or more cable locations via one or more fastening components. Thus, a next step 206 of the method includes securing the first and second segments together, wherein the cable spacer is configured to space apart and protect the plurality of cables therein.

As mentioned, the plurality of cable locations may be defined by one or more through holes configured through a thickness of the cable spacer. Thus, the method 200 may also include inserting one or more fastening components into the one or more through holes so as to secure one or more of the plurality of cables at each cable location. The method 200 may include securing the first and second segments together via one or more fastening components or corresponding locking ends of the first and second segments.

The above-described systems and methods facilitate for controlling the twisting of cables and/or to protect said cables from mechanical wear, which are routed from the nacelle into the tower of a wind turbine so as to prevent system malfunctions, overheating, and/or undesired movement of the cables within the tower. Additionally, system safety may be increased and excessive wear of the cables or cable bundles as well as wear on surrounding structures, such as, for example, ladders or lights may be reduced.

The systems and methods of the present disclosure are not limited to the specific embodiments described herein, but rather, components of the systems and/or steps of the methods may be utilized independently and separately from other components and/or steps described herein. For example, the cable securement assembly may be employed in other wind turbines, for example vertical wind turbines, other power generating machines or devices where at least one cable is routed from one section to another, whereby the one section moves in opposing directions to the other, and are not limited to practice with only the wind turbine systems as described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

COMPONENT LIST

| Reference Character | Component |
|---|---|
| 10 | Wind Turbine |
| 12 | Tower |
| 14 | Support Surface |
| 16 | Nacelle |
| 18 | Rotor |
| 20 | Rotatable Hub |
| 22 | Rotor Blade |
| 24 | Tower Section |
| 26 | Longitudinal Axis |
| 28 | Wind Direction |
| 30 | Platform(s) |
| 32 | Pitch Adjustment Mechanism |
| 33 | Platform Opening |
| 34 | Pitch Axis |
| 36 | Control System |
| 38 | Pitch Drive Motor |
| 40 | Pitch Drive Gearbox |
| 42 | Generator |
| 43 | Pitch Drive Pinion |
| 44 | Rotor Shaft |
| 45 | Pitch Bearing |
| 46 | Gearbox |
| 48 | High Speed Shaft |
| 50 | Coupling |
| 52 | Support |
| 54 | Support |
| 56 | Yaw Drive Mechanism |
| 58 | Meteorological Mast |
| 60 | Bearing |
| 62 | Bearing |
| 64 | Drive Train |
| 65 | Drip Loop Saddle |
| 66 | Cables |
| 67 | Cable Bundles |
| 68 | Drip Loop Brackets |
| 69 | Cable Locations |
| 70 | Cable Spacer |
| 71 | Open Center |
| 72 | Thickness |
| 74 | Drip Loop |
| 76 | Through Holes |
| 77 | Outer Surface of Spacer |
| 78 | Inner Surface of Spacer |
| 79 | Distance between Cable Locations |
| 80 | Fastening Components |
| 84 | First Segment |

-continued

COMPONENT LIST

| Reference Character | Component |
|---|---|
| 86 | Second Segment |
| 87 | Locking Ends |
| 88 | Locking Ends |
| 100 | Cable Securement Assembly |
| 170 | Cable Spacer |
| 171 | Open Center |
| 172 | Thickness |
| 175 | Slot |
| 177 | Outer Surface |
| 178 | Inner Surface |
| 200 | Method |
| 202 | Method Step |
| 204 | Method Step |
| 206 | Method Step |

What is claimed is:

1. A cable securement assembly for a plurality of cables within a wind turbine, the cable securement assembly comprising:
a cable spacer comprising an inner surface and an outer surface separated by a thickness, the inner surface defining an open center configured to receive the plurality of cables therein, the inner surface defining a plurality of cable locations defined by a plurality of through holes configured through the thickness; and,
a plurality of fastening components for securing one or more of the plurality of cables at the cable locations via the through holes, wherein each of the plurality of fastening components extends around the one or more of the plurality of cables at the cable locations through adjacent through holes and around a portion of the outer surface of the cable spacer.

2. The cable securement assembly of claim 1, wherein the fastening components comprise at least one of zip ties, ropes, or strings.

3. The cable securement assembly of claim 1, wherein the cable spacer is configured to fit within at least one of an opening of a platform within a tower of the wind turbine or a drip loop bracket.

4. The cable securement assembly of claim 1, wherein the cable spacer is formed from one continuous piece of material.

5. The cable securement assembly of claim 4, wherein the continuous piece of material comprises a slot.

6. The cable securement assembly of claim 1, wherein the cable spacer is formed from multiple segments joined together.

7. The cable securement assembly of claim 6, wherein the multiple segments are joined together via one or more of the plurality of fastening components.

8. The cable securement assembly of claim 6, wherein each of the multiple segments comprises corresponding locking ends, wherein the multiple segments are joined together via the corresponding locking ends.

9. A wind turbine, comprising:
a tower secured to a support surface, the tower comprising at least one platform configured therein;
a nacelle configured atop the tower;
a plurality of cables configured within the tower and nacelle; and,
a cable securement assembly configured to secure the cables within the tower, the cable securement assembly comprising:

a cable spacer comprising an inner surface and an outer surface separated by a thickness, the inner surface defining an open center configured to receive the plurality of cables therein, the inner surface defining a plurality of cable locations defined by one or more through holes configured through the thickness, and one or more fastening components configured to secure one or more of the plurality of cables at each cable location via the through holes, wherein each of the plurality of fastening components extends around the one or more of the plurality of cables at the cable locations through adjacent through holes and around a portion of the outer surface of the cable spacer.

10. The wind turbine of claim 9, wherein the fastening components comprise at least one of zip ties, ropes, strings.

11. The wind turbine of claim 9, wherein the cable spacer is configured to fit within at least one of an opening of a platform within a tower of the wind turbine or a drip loop bracket.

12. The wind turbine of claim 9, wherein the cable spacer is formed from one continuous piece of material.

13. The wind turbine of claim 12, wherein the continuous piece of material comprises a slot.

14. The wind turbine of claim 9, wherein the cable spacer is formed from multiple segments joined together.

15. The wind turbine of claim 14, wherein the multiple segments are joined together via one or more of the plurality of fastening components.

16. The wind turbine of claim 14, wherein each of the multiple segments comprises corresponding locking ends, wherein the multiple segments are joined together via the corresponding locking ends.

17. A method for protecting a plurality of cables within a wind turbine, the method comprising:
    securing one or more of the plurality of cables within a first segment of a cable spacer at a plurality of cable locations via a plurality of fastening components;
    securing one or more of the plurality of cables within a second segment of the cable spacer at a plurality of cable locations via a plurality of fastening components, wherein each of the plurality of fastening components extends around the one or more of the plurality of cables at the cable locations of each of the first and second segments through adjacent through holes extending through a wall thickness of the cable spacer and around a portion of an outer surface of the cable spacer; and,
    securing the first and second segments together, wherein the cable spacer is configured to space apart and protect the plurality of cables therein.

18. The method of claim 17, further comprising securing the first and second segments together one or more fastening components or corresponding locking ends of the first and second segments.

* * * * *